United States Patent [19]
Asrar

[11] Patent Number: 6,037,421
[45] Date of Patent: Mar. 14, 2000

[54] FUNCTIONALIZED POLYMERS

[75] Inventor: Jawed Asrar, Chesterfield, Mo.

[73] Assignee: Solutia Inc., St. Louis, Mo.

[21] Appl. No.: 09/162,651

[22] Filed: Sep. 29, 1998

Related U.S. Application Data

[60] Provisional application No. 60/060,481, Sep. 30, 1997.

[51] Int. Cl.$^7$ .................. C08F 283/04; C08G 69/48; C08G 63/68
[52] U.S. Cl. .................. 525/420; 528/272; 528/287; 528/290; 528/292; 528/293; 528/296; 528/302; 528/335; 528/337; 525/424; 525/437; 525/440; 525/535; 525/538; 525/540
[58] Field of Search .................. 528/272, 287, 528/290, 292, 293, 296, 302, 335, 337; 525/420, 424, 437, 440, 535, 538, 540

[56] References Cited

U.S. PATENT DOCUMENTS

| | | | |
|---|---|---|---|
| 3,555,056 | 1/1971 | Lamberto et al. | 260/404 |
| 3,607,804 | 9/1971 | Nishimura | 260/22 |
| 3,644,299 | 2/1972 | Fester et al. | 260/78 |
| 3,687,904 | 8/1972 | Middleton | 260/78 |
| 3,711,447 | 1/1973 | Fester et al. | 260/78 |
| 3,959,213 | 5/1976 | Gilkey et al. | 260/45 |
| 4,032,517 | 6/1977 | Pickett, Jr. et al. | 260/78 |
| 4,038,326 | 7/1977 | Kupper | 260/617 |
| 4,092,302 | 5/1978 | Pickett, Jr. et al. | 260/78 |
| 4,315,847 | 2/1982 | Login et al. | 260/45 |
| 4,387,184 | 6/1983 | Coquard et al. | 525/183 |
| 4,596,742 | 6/1986 | Selivansky et al. | 428/373 |
| 4,617,355 | 10/1986 | Gabbert et al. | 525/420 |
| 4,647,630 | 3/1987 | Schmid et al. | 525/431 |
| 4,721,650 | 1/1988 | Nunning et al. | 428/369 |
| 4,975,325 | 12/1990 | McKinney et al. | 428/371 |
| 5,120,826 | 6/1992 | Vora et al. | 528/350 |
| 5,122,601 | 6/1992 | Sachinvala | 536/125 |
| 5,137,666 | 8/1992 | Knox et al. | 264/103 |
| 5,140,098 | 8/1992 | Pipper et al. | 525/420 |
| 5,202,182 | 4/1993 | Knox et al. | 428/364 |
| 5,252,740 | 10/1993 | Hale et al. | 546/263 |
| 5,266,413 | 11/1993 | Mills et al. | 428/480 |
| 5,340,884 | 8/1994 | Mills et al. | 125/420 |
| 5,340,886 | 8/1994 | Hoyt et al. | 525/426 |
| 5,403,910 | 4/1995 | Kosinski et al. | 528/336 |
| 5,418,318 | 5/1995 | Jones et al. | 528/298 |
| 5,468,554 | 11/1995 | Windley | 428/357 |
| 5,480,926 | 1/1996 | Fagerburg et al. | 524/86 |
| 5,548,027 | 8/1996 | Heucher et al. | 525/179 |
| 5,554,720 | 9/1996 | Weaver et al. | 528/295 |
| 5,869,566 | 2/1999 | Thomas | 524/590 |

FOREIGN PATENT DOCUMENTS

| | | |
|---|---|---|
| 0 149 986 | 11/1984 | European Pat. Off. . |
| 0191 746 B1 | 10/1986 | European Pat. Off. . |
| 0 345 648 B1 | 6/1995 | European Pat. Off. . |
| 1442581 | 7/1976 | United Kingdom . |

OTHER PUBLICATIONS

Chemical Abstract 118:104655, Southern et al., "Polymer Modifications for Improved Textured Nylon 66 Yarns and Processes" (1992).
Derwent Abstract; Japan 32775A/18 (1976).
Derwent Abstract; Japan 37416Y/21 (1974).
Derwent Abstract; Japan 6611/66 (1966).

*Primary Examiner*—Samuel A. Acquah
*Attorney, Agent, or Firm*—Arnold, White & Durkee

[57] ABSTRACT

The present invention provides a condensation polymer, selected from the group consisting of polyamides and polyesters, that comprises between about 0.5% and about 4.0%, based on the theoretical moles of monomeric repeat units, of a trifunctional repeat unit. One of the functional groups of the trifunctional repeat unit comprises a moiety that imparts a desired property to the polymer, such as stain resistance or UV stabilization. One particular embodiment of the invention is a nylon 66 polymer that comprises between about 0.5% and 4.0%, based on the theoretical moles of nylon 66 repeat units, of a trifunctional repeat unit having the general formula:

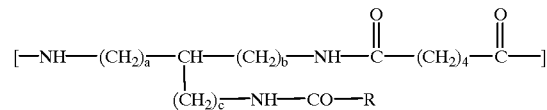

wherein R is the functional group that imparts a desired property to the polymer; a, b, and c are separately integers from 0–5. Preferably a+b=5 and c is 3.

20 Claims, No Drawings

FUNCTIONALIZED POLYMERS

This application claims priority from U.S. provisional application 60/060,481, filed on Sep. 30, 1997.

BACKGROUND OF THE INVENTION

1. Field of the Invention

The present invention relates generally to condensation polymers such as polyesters and polyamides, and more specifically to nylon 66. The present invention utilizes a trifunctional monomer to impart functionality to condensation polymers such as polyester or nylon, such as stain resistance, flame resistance, antistatic behavior, soil resistance, surface lubrication, or thermal or ultraviolet stabilization.

2. Description of Related Art

Triaminononane (TAN), also known as aminomethyl-1,8-diaminooctane, is an agent employed to provide chain branching in polyamide polymers used in fibers for such materials as clothing and carpets. Such chain branching has been used to provide processing benefits such as dying, crimping and friction false twisting, as well as to add strength to fibers. For example, in U.S. Pat. No. 4,596,742, TAN was employed to provide branch chains in a sheathed nylon 66. The sheaths contain the branching agent which has functional groups reactive with nylon 66 while the core does not contain branch chains. Such structure is reported to improve elongation and crimp development. Similar improvement to partially oriented nylon is more fully reported by J. H. Southern et al in Textile Res. Journal, 62(8), pp. 437–444 (1992), as well as in U.S. Pat. No. 4,721,650. Partially oriented nylon yarn is reported in this publication as being more highly responsive to high speed texturing and friction false twisting. These advantages are said to be obtained by either increasing the molecular weight of the polymer or by providing branch chains in the polymer by adding trifunctional compounds.

While branched polyamides have been known in the art, the benefits of branch chains have been limited. Outside of processing applications, improvements to polyamide fibers have been made through the use of additives. These additives usually coat the fibers after they are formed, or are combined with the polymer as a melt additive. However, coating may be lost with wear of the fiber. Diffusion of additives from the polymer also causes blooming, affecting the surface appearance of the product. Polymers used for medical or food applications cannot contain leachable additives for health, safety, and/or regulatory reasons. Additionally, large amounts of melt additives cannot be used: they are costly, require additional processing steps, create spinning difficulties, and reduce the strength of the fiber. As with the coat, materials added to the polymer in such a manner are not permanent.

Previous methods to overcome such problems have been to incorporate the desired functional group into the backbone of the polymer. In U.S. Pat. No. 4,092,302, phosphorous compounds were included as an integral part of the polymer chains to give fibers anti-static and flame-resistant properties. Tetraalkyl phosphonium salts were incorporated into the polymer chain in GB 1,442,581 as well.

There has been discovered a novel method to impart improved properties to condensation polyesters and polyamides, particularly nylon 66, wherein trifunctional monomers are incorporated into the polymer chain, having reactive sites available to which functional molecules may be permanently bonded.

SUMMARY OF THE INVENTION

The present invention concerns a condensation polymer, selected from the group consisting of polyamides and polyesters, that comprises between about 0.5% and about 4.0%, based on the theoretical moles of monomeric repeat units, of a trifunctional repeat unit. One of the functional groups of the trifunctional repeat unit comprises a moiety that imparts a desired property to the polymer, such as stain resistance, flame resistance, antistatic behavior, soil resistance, surface lubrication, or thermal or ultraviolet stabilization.

In one embodiment of the invention, the polymer is a polyamide and the trifunctional repeat unit comprises at least two amino or carboxyl functional groups. The trifunctional repeat unit can suitably comprise a third functional group with a moiety having the desired property, connected through an amino or carboxyl group, selected from the group consisting of, for example, sulfonic acid groups, alkyl groups having about 2–25 carbon atoms, phosphonic acid groups, phosphinic acid groups, quaternary ammonium salts, hindered phenols, polysiloxanes, benzotriazoles, and fluorocarbons.

In another embodiment of the invention, the polymer is a polyester and the trifunctional repeat unit comprises at least two carboxyl or hydroxyl groups. The third functional group can be as described above.

Another embodiment of the invention is a nylon 66 polymer comprising between about 0.5% and 4.0%, based on the theoretical moles of nylon 66 repeat units, of a trifunctional repeat unit having the general formula:

[1]

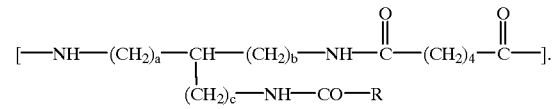

R is the functional group that imparts a desired property to the polymer; a, b, and c are separately integers from 0–5. Preferably a+b=5 and c is 3. Most preferably a is 1, b is 4, and c is 3. The polymer preferably comprises at least about 85% by weight of recurring structural units of the formula:

[2]

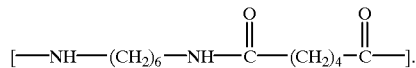

R can comprise moieties containing different functional groups, for example, a sulfonic acid group, a phosphonic acid group, a phosphinic acid group, a quaternary ammonium salt, a hindered phenol, an alkyl group having about 2–25 carbon atoms, a polysiloxane, a benzotriazole, or a fluorocarbon. Two particularly preferred R groups are prepared by condensing sulfoacetic acid and sulfobenzoic acid with an amine group of the triamine. Most preferably R is selected from the group consisting of:

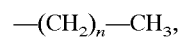

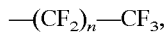

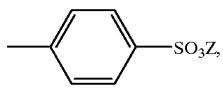

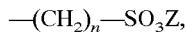

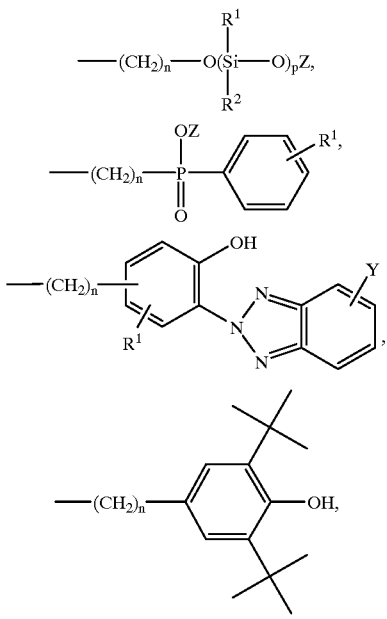

and
mixtures of one or more of the above groups with the unit of formula [2], wherein n is 1 to about 24, p is 1 to about 4,000, $R^1$ and $R^2$ are independently $C_1$–$C_{12}$ straight or branched chain alkyl, Y is hydrogen or halide, and Z is hydrogen or alkali metal.

The polymers of the present invention have a number of advantages over prior art polymers. They can have a variety of desirable properties as a result of the functional group attached to the trifunctional monomer, and they can retain those desirable properties longer than prior art polymers which contain additives that can be lost as a result of leaching, diffusion, or other mechanisms. The polymers of the present invention can be manufactured simply and inexpensively, and are useful, for example, to manufacture fibers.

DESCRIPTION OF ILLUSTRATIVE EMBODIMENTS

Polymers of the present invention preferably contain about 0.5–4.0%, based on the theoretical moles of monomeric repeat units, of a trifunctional repeat unit that imparts desirable functional properties. The trifunctional repeat unit can suitably be the reaction product of a parent trifunctional monomer having the general formula

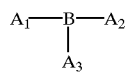

[3]

and a group C that imparts the desired property to the polymer. Two of the functional groups $A_1$ and $A_2$ on the parent trifunctional monomer will become covalently bonded to the rest of the polymer, while the third functional group $A_3$ serves as a point of attachment for the monofunctional group C. B is a linking moiety, preferably a hydrocarbon having 1–9 carbon atoms.

If the polymer to be formed is a polyamide, $A_1$, $A_2$, and $A_3$ can be amino or carboxyl groups. Examples of such parent trifunctional monomers are triaminononane (TAN), 1,3,5-benzenetricarboxylic acid, and 1,2,4-benzenetricarboxylic acid. The group C preferably has the general formula $$D-R \qquad [4]$$

where D is a carboxyl or an amino group, and R is a moiety containing at least one functional group as described previously. If $A_1$, $A_2$, and $A_3$ are amino groups, D will be a carboxyl group; if $A_1$, $A_2$, and $A_3$ are carboxyl groups, D will be an amino group.

If the polymer to be formed is a polyester, $A_1$, $A_2$, $A_3$, and D can be carboxyl or hydroxyl groups. 1,2,4-benzenetriol is an example of a suitable parent trifunctional monomer. If $A_1$, $A_2$, and $A_3$ are carboxyl groups, D will be an hydroxyl group; if $A_1$, $A_2$, and $A_3$ are hydroxyl groups, D will be a carboxyl group.

Whether the polymer is a polyamide or polyester, the reaction product of the parent trifunctional monomer and the monofunctional group C yields a trifunctional monomer having the general formula

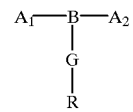

[5]

where G is —COO—, —OOC—, —CONH—, or —NHCO—.

One embodiment of the present invention provides functionalized nylon 66, comprising between about 0.5% and about 4.0%, based on the theoretical moles of nylon 66 repeat units, of a trifunctional repeat unit that comprises a group R that imparts a desired property to the polymer. R can comprise moieties containing at least one functional group, for example, a sulfonic acid group, a phosphonic acid group, a phosphinic acid group, a quaternary ammonium salt, a hindered phenol, a hydrocarbon group, particularly an alkyl group having about 2–25 carbon atoms, a polysiloxane, or a fluorocarbon. One suitable trifunctional repeat unit is a substituted aminomethyl-1,8-diaminooctane, also known as triaminononane (TAN). The amount of trifunctional repeat unit used in the present invention is most preferably about 2% based on the theoretical moles of nylon 66 repeat units.

The nature of the R group imparts functionality to the nylon 66. A variety of functional groups, having desirable properties are well known to those skilled in the art. Suitable R groups include (1) sulfonic acid groups, such as sulfobenzoic acid and sulfoacetic acid, which can impart stain resistance to the polymer; (2) phosphonic and/or phosphinic acid groups, such as 2-carboxyethyl(phenyl)phosphinic acid, which can impart flame resistance and stain resistance; (3) quaternary ammonium salts, such as (carboxymethyl) trimethyl ammonium hydroxide, which can be used to provide antistatic behavior; (4) hindered phenols, hindered amines, and benzotriazoles, which can be used to provide thermal and UV stabilization; (5) long hydrocarbon groups, such as stearic acid, which can be utilized to provide a hydrophobic surface and thereby impart soil resistance; (6)

polysiloxanes and fluorocarbons, which can be utilized as softening agents or for surface lubrication, providing a low friction polymer; and (7) mixtures of one or more of the above with nylon 66.

Nylon 66 and other polymers of the present invention can be made by methods that are well known to those skilled in the art. The reaction temperature and pressure will vary depending on the polymer. To make a modified nylon 66, the trifunctional monomer along with a derivatizing molecule to impart the desired property may be added to the nylon 66 by adding an aqueous solution of the trifunctional monomer or its salt and the derivatizing molecule or its salt to the nylon 66 salt and heating the mixture at between 200–300° C. at a pressure of about 150–300 psi. The resulting polymer may then be spun into yarn by any method known to those of skill in the art, for example by a method disclosed in U.S. Pat. Nos. 4,032,517, 4,596,742, 4,721,650, or 4,975,325, which are incorporated here by reference.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

Into a 230 g capacity, stirred autoclave was added 147.7 g nylon 66 dry salt, 8.8 g of a 50% aqueous solution of triaminononane (TAN)/6 salt, 2.85 g sulfobenzoic acid, 1 drop of a 5% solution of phenyl phosphinic acid and 46 mL DI water. (TAN/6 salt is the salt formed from TAN and adipic acid.) The autoclave was sealed, purged with nitrogen and pressurized to 250 psi with nitrogen. The reaction mixture was heated to 243° C. over a period of about 32 minutes while the water was distilled off. Pressure was then reduced to atmospheric in about 30 minutes. The temperature was increased to 276° C. and the reaction mass was held at that temperature for about 30 minutes. The resulting polymer was melt spun directly from the autoclave through a 6 hole spinneret. The resulting yarn had a denier of 161, a relative viscosity (RV) of 34.7 and a melting point of 251° C. The yarn exhibited boiling water shrinkage of 9.6%, and upon analysis was found to have 24.4 amine ends and 172.7 acid ends.

Other modified nylon 6,6 polymers made using the same general approach, and their relative viscosity (RV) values are as follows:

TABLE 1

| POLYMER | RV |
|---|---|
| 6,6 nylon, 2 mole % TAN-6, 2 mole % sulfobenzoic acid (K salt) | 39.4 |
| 6,6 nylon, 2 mole % TAN-6, 2 mole % sulfobenzoic acid (K salt) | 34.7 |
| 6,6 nylon, 2 mole % TAN-6, 3 mole % sulfobenzoic acid (K salt) | 19.1 |
| 6,6 nylon, 2 mole % TAN-6, 2 mole % stearic acid | 30 |
| 6,6 nylon, 2 mole % TAN-6, 3 mole % sulfobenzoic acid (K salt, neutralized with hexamethylenediamine) | 41.4 |
| 6,6 nylon, 2 mole % TAN-6, 2 mole % XPM-100J, 2 mole % NaOH, 1 mole % hexamethylenediamine | 34.2 |

XPM100-J is a phosphinic acid, (2-carboxyethyl) phenylphosphinic acid, that is commercially available from Monsanto Company.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A condensation polymer, selected from the group consisting of polyamides and polyesters, that comprises between about 0.5% and about 4.0%, based on the theoretical moles of monomeric repeat units, of a trifunctional repeat unit, wherein one of the functional groups of the trifunctional monomer comprises a moiety that imparts a desired property to the polymer.

2. The polymer of claim 1, where the polymer is a polyamide and the trifunctional repeat unit comprises at least two amino or carboxyl functional groups.

3. The polymer of claim 2, where the trifunctional repeat unit comprises a third functional group selected from the group consisting of sulfonic acid groups, alkyl groups having about 2–25 carbon atoms, and phosphonic acid groups.

4. The polymer of claim 1, where the polymer is a polyester and the trifunctional repeat unit comprises at least two carboxyl or hydroxyl groups.

5. A nylon 66 polymer comprising between about 0.5% and 4.0%, based on the theoretical moles of nylon 66 repeat units, of a trifunctional repeat unit having the general formula:

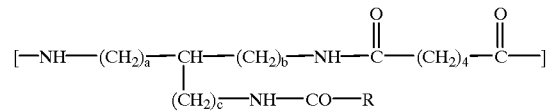

wherein R is a functional group that imparts a desired property to the polymer, and wherein a, b, and c are separately integers from 0–5.

6. The polymer of claim 5 wherein a+b=5 and c is 3.

7. The polymer of claim 5 wherein R comprises a moiety containing a sulfonic acid group.

8. The polymer of claim 5 wherein R comprises a moiety containing a phosphonic acid group.

9. The polymer of claim 5 wherein R comprises a moiety containing a phosphinic acid group.

10. The polymer of claim 5 wherein R comprises a moiety containing a quaternary ammonium salt.

11. The polymer of claim 5 wherein R comprises a moiety containing a hindered phenol.

12. The polymer of claim 5 wherein R comprises a moiety containing an alkyl group having about 2–25 carbon atoms.

13. The polymer of claim 5 wherein R comprises a moiety containing a polysiloxane.

14. The polymer of claim 5 wherein R comprises a moiety containing a benzotriazole.

15. The polymer of claim 5 wherein R comprises a moiety containing a fluorocarbon.

16. The polymer of claim 5 wherein R is a sulfoacetic acid group.

17. The polymer of claim 5 wherein R is a sulfobenzoic acid group.

18. The polymer of claim 5 wherein a is 1 and b is 4.

19. The polymer of claim 5, wherein R is selected from the group consisting of:

—(CH$_2$)$_n$—CH$_3$,
—(CF$_2$)$_n$—CF$_3$,

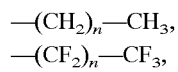

—(CH$_2$)$_n$—SO$_3$Z,

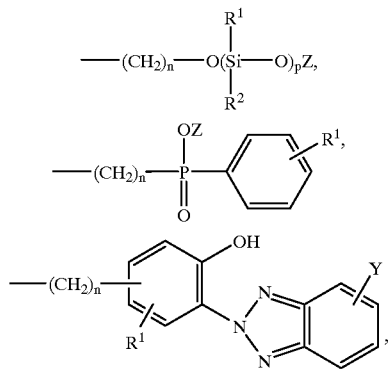

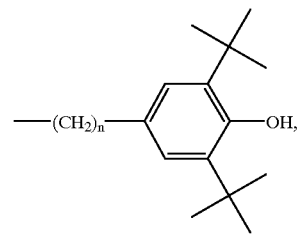

mixtures thereof, and mixtures of one or more of the above groups with a unit having the formula

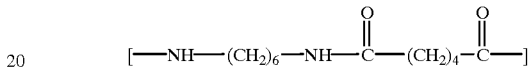

wherein n is 1 to about 24, p is 1 to about 4,000, R$^1$ and R$^2$ are independently C$_1$–C$_{12}$ straight or branched chain alkyl, Y is hydrogen or halide, and Z is hydrogen or alkali metal.

20. The polymer of claim 19, wherein Z is Na.

* * * * *